(12) United States Patent
Gaucas et al.

(10) Patent No.: US 8,429,559 B2
(45) Date of Patent: Apr. 23, 2013

(54) ELICITATION METHOD FOR CUSTOM IMAGE PREFERENCES USING KEYWORDS

(75) Inventors: Dale Ellen Gaucas, Penfield, NY (US); Kirk J. Ocke, Ontario, NY (US); Michael David Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 12/581,679

(22) Filed: Oct. 19, 2009

(65) Prior Publication Data

US 2011/0093802 A1    Apr. 21, 2011

(51) Int. Cl.
*G06F 3/048* (2006.01)
(52) U.S. Cl.
USPC .......................................... 715/789; 715/866
(58) Field of Classification Search .................. 715/789, 715/866
See application file for complete search history.

(56) References Cited

U.S. PATENT DOCUMENTS

| | | | |
|---|---|---|---|
| 5,133,052 A * | 7/1992 | Bier et al. ...................... 715/234 |
| 6,021,412 A * | 2/2000 | Ho et al. .............................. 1/1 |
| 6,941,321 B2 * | 9/2005 | Schuetze et al. ...................... 1/1 |
| 7,032,179 B2 * | 4/2006 | Mack et al. .................... 715/762 |
| 7,343,320 B1 * | 3/2008 | Treyz et al. .................. 705/26.5 |
| 7,369,164 B2 * | 5/2008 | Parulski et al. .......... 348/231.99 |
| 2002/0054059 A1 * | 5/2002 | Schneiderman ............... 345/700 |
| 2003/0140017 A1 * | 7/2003 | Patton et al. .................... 705/410 |
| 2003/0167264 A1 * | 9/2003 | Ogura et al. ....................... 707/3 |
| 2003/0217329 A1 * | 11/2003 | Good ............................. 715/500 |
| 2004/0205138 A1 * | 10/2004 | Friedman et al. ............. 709/206 |
| 2006/0058014 A1 * | 3/2006 | Seo et al. ........................ 455/418 |
| 2006/0069574 A1 * | 3/2006 | Ok ..................................... 705/1 |
| 2006/0129417 A1 * | 6/2006 | Williams et al. .................. 705/1 |
| 2007/0097421 A1 * | 5/2007 | Sorensen et al. ............. 358/1.15 |
| 2008/0052620 A1 * | 2/2008 | Hwang ......................... 715/272 |
| 2008/0163069 A1 * | 7/2008 | Eilers ............................ 715/744 |
| 2010/0083141 A1 * | 4/2010 | Grace ........................... 715/758 |
| 2010/0094696 A1 * | 4/2010 | Molinelli et al. .......... 705/14.16 |
| 2011/0029635 A1 * | 2/2011 | Shkurko et al. ............... 709/217 |
| 2011/0055049 A1 * | 3/2011 | Harper et al. ................ 705/27.1 |

* cited by examiner

*Primary Examiner* — Doon Chow
*Assistant Examiner* — Le Nguyen
(74) *Attorney, Agent, or Firm* — Fox Rothschild LLP

(57) ABSTRACT

A method and user interface for eliciting and processing user feedback includes displaying on a computing device display a digital asset, wherein the digital asset has an associated list having at least one keyword; displaying on the computing device display a user feedback interface, the user feedback interface comprising at least one input component configured to receive user generated input; receiving a keyword replacement pair via the at least one input component; storing the keyword replacement pair; analyzing the stored keyword replacement pair; and producing results indicting potential changes to the digital asset based upon the analyzing. Based upon the results of the analysis, an updated version of the digital asset may be produced including any user suggested changes.

14 Claims, 4 Drawing Sheets

ELICITATION METHOD FOR CUSTOM IMAGE PREFERENCES USING KEYWORDS

BACKGROUND

The present application relates to methods and systems for eliciting feedback of media offered in a digital library. In some embodiments, the present application relates to elicitation and processing methods related to custom content selection for physical or electronic document or production systems using keyword replacement.

Many websites and interactive software programs offer digital asset libraries from which individual images, document templates, and/or graphics may be purchased by a user. The user can then use these purchased digital assets in personalized documents such as calendars, greeting cards, posters, etc. Individual digital marketplaces have been developed to facilitate the sale of digital assets, as well as to handle the transfer of any use rights associated with the digital asset. An example of a digital marketplace is the XMPie Marketplace.

In typical digital marketplaces, the user can use a keyword search to identify individual assets. Each asset may have one or more associated keywords or tags included by the asset creator or a second party, such as an administrator managing the digital marketplace or social tagging capability. For example, if the user is searching for an image of a present, the user may search for keywords such as "gift" or "present." FIG. 1 illustrates an exemplary results page 100 of a digital marketplace in which the user has selected an image 102 entitled "A Giant Gift" for review.

Some marketplaces solicit customer feedback through web-form based input, or through email or other text responses. These responses are then reviewed by a marketplace administrator, and based upon the responses, a new image may be created based upon the responses, or an existing image may be reassigned new or additional keywords. However, soliciting information via web-forms or email is tedious and may result in fewer customers leaving feedback.

SUMMARY

The invention described in this document is not limited to the particular systems, methodologies or protocols described, as these may vary. The terminology used herein is for the purpose of describing particular embodiments only, and is not intended to limit the scope of the present disclosure.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a user interface for eliciting and processing user feedback including at least one software module installed on a computer readable medium and containing instructions for operating a computer processor to perform a process. The related process includes the steps of displaying on a computing device display a digital asset, wherein the digital asset has an associated list having at least one keyword, displaying on a computing device display a user feedback interface, the user feedback interface comprising at least one input component configured to receive user generated input, receiving a keyword replacement pair via the at least one input component, storing the keyword replacement pair, analyzing the stored keyword replacement pair, and producing results indicting potential changes to the digital asset based upon the analyzing.

In another general respect, the embodiments disclose a method of eliciting and processing user feedback. The method includes displaying on a computing device display a digital asset having an associated list having at least one keyword, displaying on a computing device display a user feedback interface, the user feedback interface comprising at least one input component configured to receive a user provided keyword replacement pair, storing the keyword replacement pair in a computer readable medium, analyzing the stored keyword replacement pair, and producing results indicating potential changes to the digital asset based upon the analyzing.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
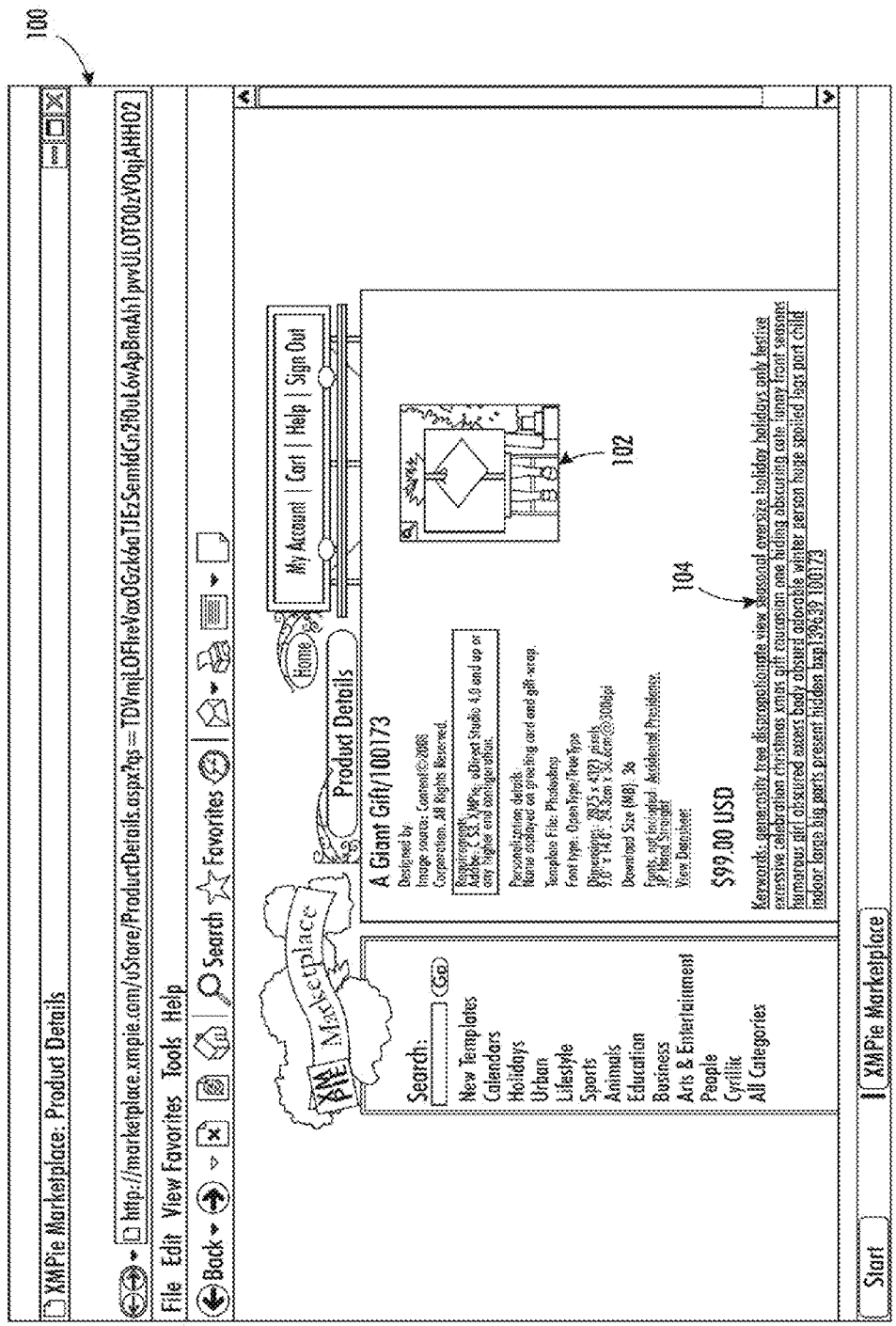
FIG. 1 illustrates a digital marketplace web site according to the known art.

For purposes of the discussion below, a "digital marketplace" refers to a website or other user portal or interface where a user or customer may purchase one or more digital assets.

A "digital asset" refers to a graphic, template and/or image available for purchase at a digital marketplace.

The present invention provides a method and system for soliciting and analyzing feedback indicating user preferred modifications to tagged digital assets offered for purchase at a digital marketplace. The digital marketplace may offer a pre-populated gallery of digital assets for inclusion in printed products such as calendars, greeting cards, posters, etc. The digital assets may be tagged with keywords that describe the contents of the digital asset. Referring back to FIG. 1, a set of keywords 104 is included that describe the image 102. The keywords may be defined by the digital asset's creator/provider, the digital marketplace owner, or through social tagging where input from individual users is applied to the digital assets.

Using these keywords, a digital marketplace may solicit suggestions or feedback from users relating to digital asset modifications that may make the digital asset more likely to be purchased. The digital marketplace, or data analysis software analyzing the feedback, may perform a post data analysis of the feedback to determine which digital asset modifications may make the most popular new additions to the digital marketplace.

The digital marketplace may include a user feedback interface which may allow the user to suggest changes to a digital asset. The user may select a keyword tag representing an aspect of the digital asset which they would like to see modified, and then specify a new keyword that conveys information regarding the change. The new keyword may be chosen from an existing drop-down list. The new keyword may also be entered as text when none of the suggested alternatives in the drop-down list are acceptable to the customer.

In a case when the digital asset is not tagged with an appropriate keyword, the user may enter keyword pairs where the first keyword is a new tag representing a feature or concept in the original image and the second keyword represents the desired change in a modified image based on the original. For example, in the image 102 of FIG. 1, a user may wish to replace the girl in the image with a boy. In the case where the image 102 does not have "girl" as a selectable keyword, the user may enter a keyword pair (girl, boy) indicating the user wishes to see the girl in the image replaced with a boy. The keyword "girl" may be added to the original image 102 thereby augmenting the set of keywords 104, and the keyword "boy" may replace the newly added keyword "girl" in a modification of the image containing a boy in place of the girl. These keyword replacement and augmentation methods provide an easy mechanism for the customer to convey the new desired feature for an image or graphic and facilitate subsequent data analysis of the preferred modifications.

The list options presented to the customer for the keyword replacement or keyword augmentation can be derived via the use of synsets (or collections of similar words like "man", "guy", "male"), taxonomies, ontologies, and/or heuristics as shown in the examples below. For example, the tag "Christmas" may appear in a taxonomy for the concept "celebrations" and in a synset that also includes the terms "Christmas_Day," and "Xmas." Additionally, the list options may include replacement suggestions previously input by other users. For example, in FIG. 1, if a previous user had suggested "rocking_horse" replace "tree" in image 102, then "rocking_horse" may be added to the drop-down list of potential replacement keywords for "tree."

Alternatively, a user may want to see particular content added to or removed from a digital asset. Included in the user feedback interface may be an add or delete option for the keyword set that describes the current image. Instead of providing a semantic term of the digital asset content to replace, the user may provide a keyword pair which contains reserved words such as "add" and "delete." For example, (add, rocking_horse) may convey a request to a graphic artist to add a rocking horse to a particular digital asset. Conversely, (delete, chair) may convey a request to delete a chair from a particular digital asset. Similarly, additional reserved words such as "less" and "more" may be used by a user to convey they would like to see less trees in a digital asset, e.g., (less, trees), or more balloons in a digital asset, e.g., (more, balloons).

Alternatively, a user may want to see particular content in a digital asset personalized. Included in the user feedback interface may be a personalize option for the keyword set that describes the current image. Instead of providing a semantic term of the digital asset content to replace, the user may provide a keyword pair which contains a reserved word such as "personalize." For example, (personalize, rocking_horse) may convey to a variable data designer to impose a person's name (or any other information provided in the user feedback personalization option) on a rocking horse image in a particular digital asset, similar to the way the gift in FIG. 1 is personalized. Conversely, a keyword pair such as (depersonalize, gift) may indicate a user request to remove a personalized message from a gift image in a digital asset such at that shown in FIG. 1.

The digital marketplace may save the user's feedback in a unique feedback file, a common feedback file, or as an entry in a database by the digital marketplace for later reference and for use by data analysis software for post data analysis. A human, such as a data analyst, may also perform post data analysis when trends in the feedback are determinable from visual inspection of the feedback data. User contact information may also be saved such that users may be notified when new digital assets that incorporate the desired changes are made available. The automated post data analysis may use known statistical analysis and clustering techniques to determine which keyword pairs and keyword pair clusters occur frequently as feedback for a given digital asset. After periodic input data analysis, graphic artists and designers can be engaged in order to produce those images and graphics most desired by customers. The solicitation and analysis methods described above will be described in greater detail below in reference to FIGS. 2 and 3.

Figure 2:
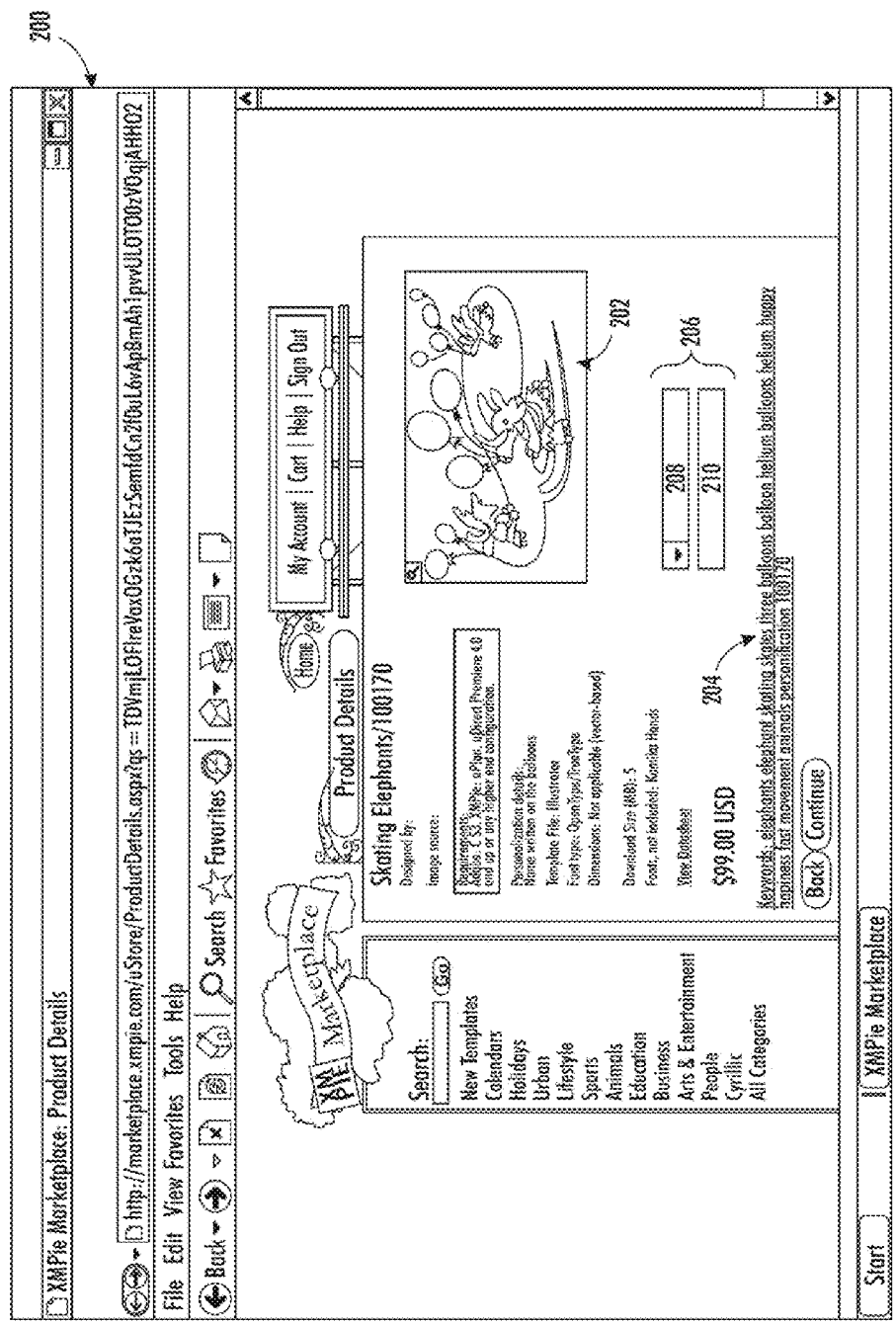
FIG. 2 illustrate various embodiments of an exemplary digital marketplace web site.

FIG. 2 illustrates a results page 200 of an exemplary digital marketplace. In this example, a user has chosen to view an image 202 showing a series of elephants holding balloons. A listing of keywords 204 describing the image 202 includes "elephants," "elephants_skating," "skates," "three_balloons," etc. As discussed above, the keywords 204 may be defined by the digital asset's (i.e., the image 202's) creator/provider, the digital marketplace owner, or through social tagging where input from individual users is applied to the digital assets.

A user feedback interface 206 may also be provided on the results page 200. The user feedback interface may include various components configured to receive user generated input. For example, the various components may include a dynamic list of selectable keyword alternatives such as a drop-down list 208, and an area defined as being able to receive a keyword alternative as user generated freeform text such as text field 210. As discussed above, the drop-down list 208 may present pre-populated options for keyword replacement. These options may include alternative keywords based upon an ontology or taxonomy related to the first keyword, previous users' replacements for the first keyword, or other variously derived replacements. In this example, the user may select one of the keywords 204, and then may select a replacement keyword from the dynamically generated drop-down list 208, or the user may enter a replacement keyword in the text field 210.

For example, a user may wish to replace the keyword 204 "elephant" with "dog". The user may select the keyword 204 "elephant" from the listed keyword set 204 causing a pop-up drop-down list 208 to appear containing possible alternatives to "elephant" based on an underlying ontology such as a classification for mammals, or based on previous user suggestions. The user may select a replacement keyword "dog" from the drop-down list 208 if it appears in the list, or alternatively, the user may type "dog" into text field 210. This creates a user generated keyword replacement pair (elephant, dog) which may be stored for later analysis. During analysis, a trend may be detected indicating the desire of a number of users to see changes to the image 202. A new image or digital asset may be created reflecting the user feedback.

In order to better group feedback, sub-taxonomies may be incorporated during analysis of the feedback. For example, the following sub-taxonomy may be used:

Pet
  Dog
    Spaniel
    Poodle
    Terrier, etc.
  Cat
    Siamese
    Persian, etc.

In this example, during analysis, any replacement keyword pairs that include Spaniel, Poodle or Terrier would indicate the feedback falls into a subclass of Dog.

Additionally, a user may make a number of suggested changes in their feedback. These changes may be clustered using common clustering techniques and stored for later analysis. If during analysis, multiple users' feedback includes similar clusters of suggested changes, the feedback may indicate various changes that may make a digital asset more popular.

A user's feedback may also result in a keyword acquisition. For example, if the image 202 did not include the keyword 204 "balloon," and multiple users input (balloon, kite) as a replacement keyword pair, the analysis software may add balloon as a keyword for the image 202.

Figure 3:
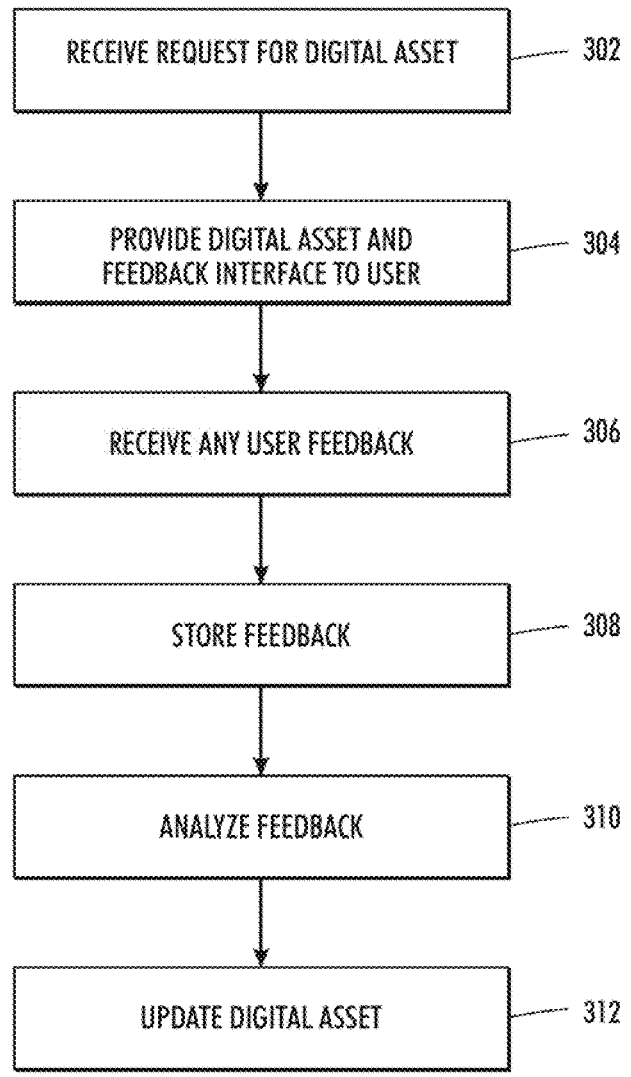
FIG. 3 illustrates various embodiments of a elicitation and processing method.

FIG. 3 illustrates a flowchart showing an exemplary process for eliciting and processing feedback from a user. Initially, a request for a digital asset is received 302. This request may be based upon a keyword search. When the request is received 302, the request is processed and a results page is provided 304 to the user along with a digital asset and a user feedback interface. The user may have the option to purchase the digital asset and/or to leave feedback related to the digital asset. If the user opts to leave feedback, the feedback may be received 306 and stored 308. The feedback may be stored as a unique file, in a common file containing other feedback related to the digital asset, or as an entry in a database. The stored feedback may be analyzed 310 to identify any trends. If, during analysis 310, the analyzing software identified a trend in the feedback indicating common digital asset changes, the digital asset may be updated 312.

The heuristics discussed earlier for displaying keyword alternatives may be more sophisticated depending upon the underlying knowledge base of the analysis software. For example, the pre-defined keyword list presented to a user may be augmented by including the most commonly requested changes based upon historical data that is collected and analyzed. In the example discussed in reference to FIG. 2 above, the user wishes to replace "elephant" with "dog." If analysis of the current data shows that 75% of those requesting a change would like a dog in the image 202, "dog" could be moved to the top of the drop-down list 208 of suggested keyword replacements when presented to the user.

A digital marketplace may also utilize keyword organization software configured to acquire additional suggestions from a user based on their current feedback. For example, consider the use of "keyword groups" for certain domain concepts such as "Christmas" which, for example, may have associated concepts such as "tree," "garland," "poinsettia," "amaryllis," "wreath," "candles" etc. Such groups may be implemented by associating tags with keyword synsets, e.g., the "wreath" synset may have the tag "Christmas." By using such keyword groups, if a user replaces the keyword "Christmas" with "Valentine's_Day", the keyword organization software may deduce that the "tree" keyword is in the "Christmas" group but not in the "Valentine's Day" group. By using this knowledge, the digital marketplace may prompt the user to consider a substitution for the "tree" keyword in addition to the "Christmas" keyword to refine how they would like to see the image modified to meet their needs.

The keyword organization software may indicate preferences related to image concepts such as color harmony. For example, consider FIG. 2 above containing the keyword tag "happy" listed in the keywords 204. A user might suggest a replacement tag such as "bold" which could be interpreted as a change in the color palette of the modified image that captures a different mood.

Additionally, the digital marketplace and feedback analysis may further be expanded to include notions of location or object selection within the image/graphic, manipulation of variable data content areas, etc. For example, keywords may be tagged to specific features of the image. In the example discussed with FIG. 2 above, the user may wish to replace an "elephant" with a "dog." Instead of indicating that the keyword "elephant" should be "dog" in a modified image, the user may select the region of the image that represents the elephant resulting in a drop-down list of alternative keywords for that region/feature (e.g., "dog," "cat").

The digital marketplace may also allow the user to not only select the predefined regions/features of the image, but also create new regions/features. If a new region intersects multiple regions/features, the user may be prompted whether or not they wish to apply new keywords to each region/feature separately or as a whole. For example, region definition could be used to specify color tag changes in the areas of the image 202 of FIG. 2 containing the balloons.

Figure 4:
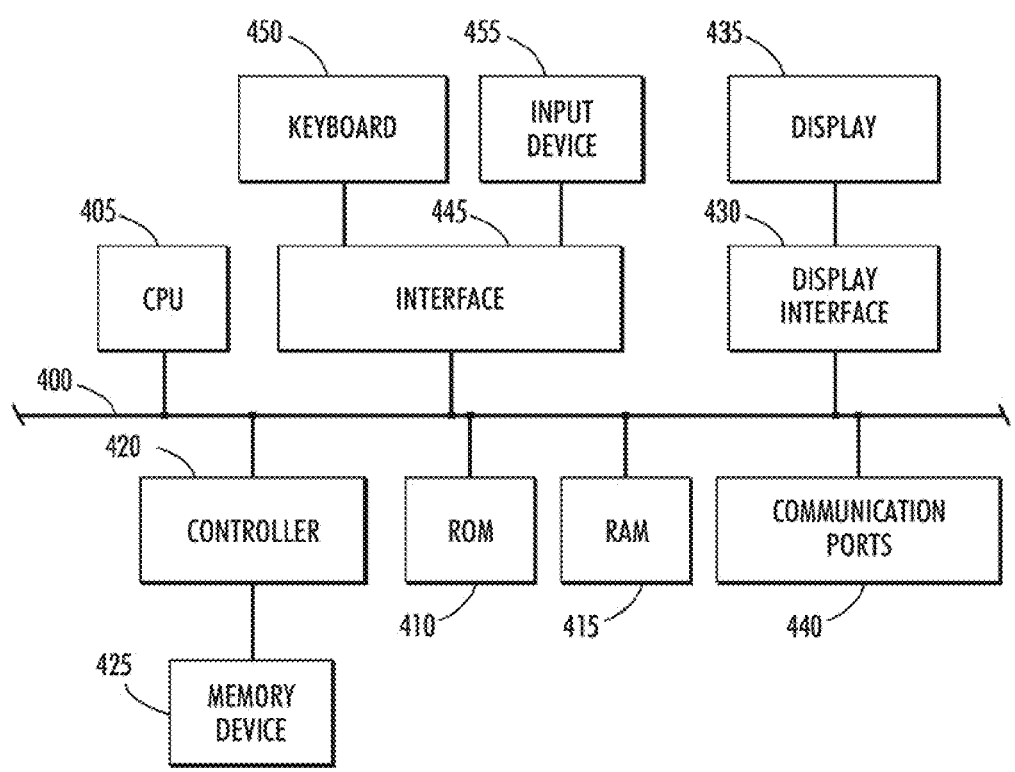
FIG. 4 illustrates various embodiments of a computing device for implementing various methods and processes described herein.

The digital marketplace, user feedback interface, and various software modules described above may be presented on a display based on software modules including computer-readable instructions that are stored on a computer readable medium such as a hard drive, disk, memory card, USB drive, or other recording medium. FIG. 4 depicts a block diagram of exemplary internal hardware that may be used to contain or implement program instructions such as the software modules discussed above in reference to FIGS. 2 and 3. A bus 400 serves as the main information highway interconnecting the other illustrated components of the hardware. CPU 405 is the central processing unit of the system, performing calculations and logic operations required to execute a program. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any feedback information, common files for storing groups of feedback information, or one or more databases for storing the feedback information.

Program instructions, software or interactive modules for providing the digital marketplace and performing analysis on any received feedback may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives.

What is claimed is:

1. A user interface for eliciting and processing user feedback comprising:
   a non-transitory computer readable medium storing at least one software module containing instructions for operating a computer processor to perform a process, the processing comprising:
      displaying on a computing device display a digital asset, wherein the digital asset has an associated list comprising a plurality of keywords, wherein the digital asset comprises at least one of an image, a graphic or a template,
      displaying on a computing device display a user feedback interface, the user feedback interface comprising at least one input component configured to receive user generated input,
      receiving a keyword replacement pair via the at least one input component, wherein the keyword replacement pair indicates a user selected portion of the digital asset and a requested change to the user selected portion of the digital asset, and wherein the keyword pair comprises:
         a first keyword indicating an element of the digital asset to be changed, and
         a second keyword indicating a user requested change to the element of the digital asset to be changed,
      storing the keyword replacement pair,
      analyzing the stored keyword replacement pair against a plurality of previously received user generated input to determine any potential trends in requested changes received from a plurality of users, wherein a potential trend comprises a cluster of similarly suggested changes based upon feedback received from the plurality of users, and
      in response to identifying a potential trend in requested changes received from a plurality of users, producing results indicting potential changes to the digital asset, wherein the results comprise at least one new image based upon the digital asset and the keyword replacement pair.

2. The user interface of claim 1, wherein the first keyword is selected from the list associated with the digital asset.

3. The user interface of claim 1, wherein the first keyword is a reserved keyword indicating a defined action be performed to the digital asset.

4. The user interface of claim 3, wherein the first keyword indicates one of an addition to and a deletion from the digital asset, and the second keyword indicates an item to be added to or deleted from the digital asset.

5. The user interface of claim 3, wherein the first keyword indicates one of a personalization or a depersonalization of an item in the digital asset, and the second keyword indicates the item to be personalized or depersonalized.

6. The user interface of claim 1, wherein the at least one input component comprises a dynamic list of selectable keyword alternatives.

7. The user interface of claim 1, wherein the at least one input component further comprises a field configured to receive user generated freeform text.

8. A method of eliciting and processing user feedback, the method comprising:
   displaying on a computing device display a digital asset having an associated list comprising a plurality of keywords, wherein the digital asset comprises at least one of an image, a graphic or a template;
   displaying on a computing device display a user feedback interface, the user feedback interface comprising at least one input component configured to receive a user provided keyword replacement pair, wherein the keyword replacement pair indicates a user selected portion of the digital asset and a requested change to the user selected portion of the digital asset, and wherein the keyword replacement pair comprises:
      a first keyword indicating an element of the digital asset to be changed, and
      a second keyword indicating a user requested change to the element of the digital asset to be changed;
   storing the keyword replacement pair in a computer readable medium;
   analyzing the stored keyword replacement pair against a plurality of previously received user generated input to determine any potential trends in requested changes received from a plurality of users, wherein a potential trend comprises a cluster of similarly suggested changes based upon feedback received from the plurality of users; and
   in response to identifying a potential trend in requested changes received from a plurality of users, producing results indicating potential changes to the digital asset, wherein the results comprise at least one new image based upon the digital asset and the keyword replacement pair.

9. The method of claim 8, wherein the providing the first keyword comprises selecting the first keyword from the list associated with the digital asset.

10. The method of claim 8, wherein the first keyword is a reserved keyword indicating a defined action be performed to the digital asset.

11. The method of claim 10, wherein the first keyword indicates one of an addition to and a deletion from the digital asset, and the second keyword indicates an item to be added to or deleted from the digital asset.

12. The method of claim 10, wherein the first keyword indicates one of a personalization or a depersonalization of an item in the digital asset, and the second keyword indicates the item to be personalized or depersonalized.

13. The method of claim 8, wherein the at least one input component comprises a dynamic list of selectable keyword alternatives.

14. The method of claim 13, wherein the at least one input component further comprises a field configured to receive user generated freeform text.

* * * * *